United States Patent
Hanson

(10) Patent No.: US 9,882,402 B2
(45) Date of Patent: Jan. 30, 2018

(54) RECHARGEABLE BATTERY AUTO-CYCLER REQUIRING LOWER POWER AND DISSIPATING REDUCED WASTE HEAT

(71) Applicant: Hamilton Sundstrand Corporation, Charlote, NC (US)

(72) Inventor: Thomas David Hanson, Houston, TX (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 259 days.

(21) Appl. No.: 14/707,102

(22) Filed: May 8, 2015

(65) Prior Publication Data

US 2016/0329726 A1 Nov. 10, 2016

(51) Int. Cl.
*H02J 7/00* (2006.01)

(52) U.S. Cl.
CPC ............ *H02J 7/0024* (2013.01); *H02J 7/007* (2013.01); *H02J 7/0026* (2013.01)

(58) Field of Classification Search
CPC ........ H02J 7/0024; H02J 7/0026; H02J 7/007; H01M 10/44; H01M 10/48; H01M 2010/4271; H01M 10/4207

See application file for complete search history.

(56) References Cited

U.S. PATENT DOCUMENTS

| | | | |
|---|---|---|---|
| 3,356,922 A | 12/1967 | Johnston | |
| 5,652,497 A * | 7/1997 | Boivie | H01M 10/4242 320/128 |
| 2014/0101476 A1* | 4/2014 | Lu | H04L 12/2807 713/340 |
| 2015/0077061 A1* | 3/2015 | Nomura | H01M 10/441 320/126 |

FOREIGN PATENT DOCUMENTS

CN 102684273 A 9/2012

* cited by examiner

*Primary Examiner* — Drew A Dunn
*Assistant Examiner* — Sailesh Thapa
(74) *Attorney, Agent, or Firm* — Carlson, Gaskey & Olds, PC

(57) ABSTRACT

A battery charger system includes a power supply and a switch connected to the power supply wherein the switch has a first switch half and a second switch half. First and second batteries are selectively connected to the power supply via the switch. The first and second switch halves are moved between a plurality of operational positions to fully charge the first battery, discharge the first battery into the second battery, discharge the second battery into the first battery, and fully charge the second battery.

16 Claims, 1 Drawing Sheet

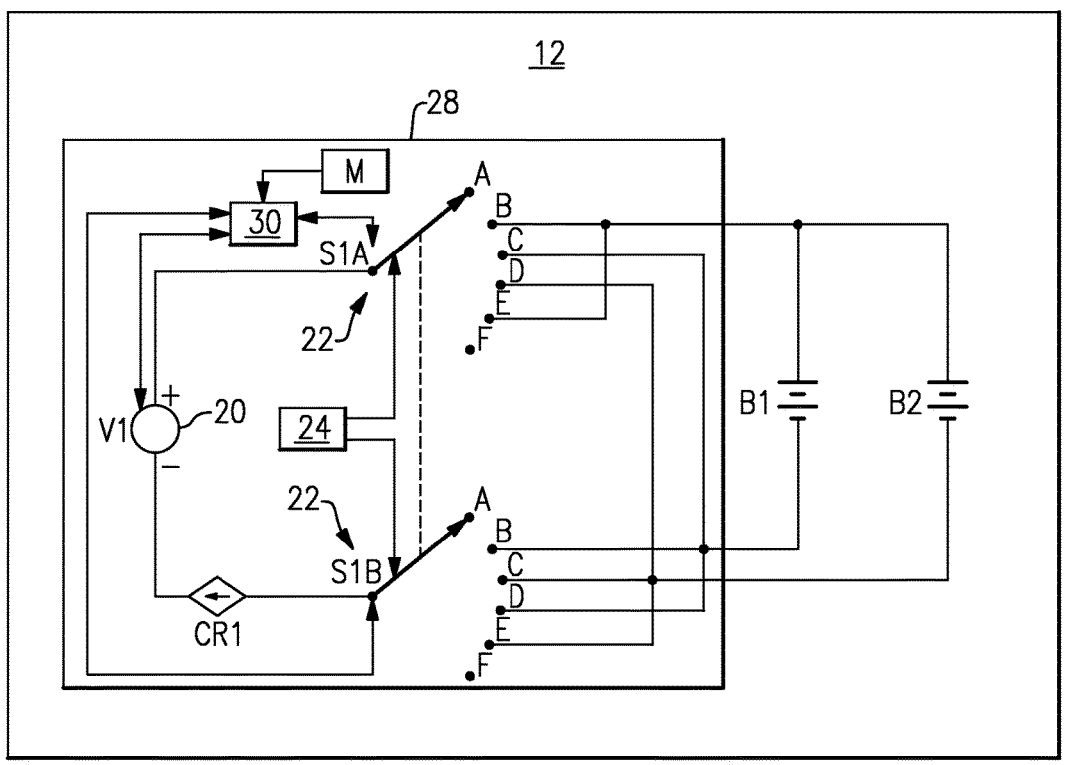

RECHARGEABLE BATTERY AUTO-CYCLER REQUIRING LOWER POWER AND DISSIPATING REDUCED WASTE HEAT

STATEMENT REGARDING FEDERALLY SPONSORED RESEARCH OR DEVELOPMENT

This invention was made with government support under Contract No. NNJ10TB01C, awarded by NASA. The Government has certain rights in this invention.

BACKGROUND OF THE INVENTION

Non-rechargeable batteries and rechargeable batteries produce current the same way, which is through an electrochemical reaction involving an anode, cathode and electrolyte. The advantage that the rechargeable battery has is that the reaction is reversible. When electrical energy from an outside source is applied to a rechargeable cell, the negative-to-positive electron flow that occurs during discharge is reversed, and the cell's charge is restored.

However, after a number of recharge cycles, rechargeable batteries can lose discharge capacity. For example, if these batteries were not fully discharged every time they were used, they would quickly lose capacity. This means the batteries were able to discharge less energy than when in their new condition. This is known as the memory effect.

With some battery chemistry types, discharge capacity can be reconditioned by "auto-cycling," which is the process of fully discharging and recharging the battery one or several times. Equipment that is designed to recondition a battery in this way simply discharges the battery through a current resistive device and "wastes" the energy by converting the energy to heat. In most situations, this is acceptable because the cost of wasted energy is very small and the waste heat is easily transferred to the environment.

However, in some circumstances, the energy cost may be more meaningful, or the waste heat may be more difficult to dissipate. Such is the case for the batteries used in spacecraft. For example, the International Space Station can provide only limited cooling capacity to a battery charger module, which also performs the auto-cycling for spacesuit batteries. As such, it would be useful to reduce the waste heat in this type of situation.

SUMMARY OF THE INVENTION

In a featured embodiment, a battery charger system includes a power supply and a switch connected to the power supply wherein the switch has a first switch half and a second switch half. First and second batteries are selectively connected to the power supply via the switch. A control moves the first and second switch halves between a plurality of operational positions to fully charge the first battery, discharge the first battery into the second battery, discharge the second battery into the first battery, and fully charge the second battery.

In another embodiment according to the previous embodiment, the plurality of operational positions includes at least a first position where the first and second batteries are connected to a charger module but not connected to the power supply, a second position where both the first and second switch halves connect the first battery to the power supply to charge the first battery, a third position where the first and second switch halves are positioned to discharge the first battery into the second battery, a fourth position where the first and second switch halves are positioned to discharge the second battery into the first battery, and a fifth position where the switch halves are positioned to charge the second battery.

In another embodiment according to any of the previous embodiments, the first and second switch halves are moved from the second position once the battery is fully charged to the third position to charge the second battery from the discharge of the first battery.

In another embodiment according to any of the previous embodiments, the first and second switch halves are moved from the third position once the second battery is fully charged to the fourth position to charge the first battery from the discharge of the second battery.

In another embodiment according to any of the previous embodiments, the first and second switch halves are moved back and forth between the third and fourth positions until both the first and second batteries have been cycled to satisfy a predetermined cycle criteria.

In another embodiment according to any of the previous embodiments, the first and second switch halves are moved from the fourth position once the first battery is fully charged via the discharge of the second battery to the fifth position to perform a final charge of the second battery without discharging the first battery.

In another embodiment according to any of the previous embodiments, the first and second switch halves are moved from the fifth position, once both the first and second batteries are fully charged, to a sixth position where both the first and second batteries may be disconnected from the power supply.

In another embodiment according to any of the previous embodiments, a current regulator is used to limit charging current into the first and second batteries and to limit discharging current out of the first and second batteries, and wherein the current regulator controls charge current to follow a prescribed optimal profile based on battery type, and/or to control discharge current to follow a prescribed optimal profile based on the battery type.

In another featured embodiment, a method of recharging a battery system includes the steps of: connecting a switch to a power supply, the switch having a first switch half and a second switch half; providing a first battery that can be selectively connected to the power supply via the switch and a second battery that can be selectively connected to the power supply via the switch; and moving the first and second switch halves between a plurality of operational positions to fully charge the first battery, discharge the first battery into the second battery, discharge the second battery into the first battery, and fully charge the second battery.

In another embodiment according to any of the previous embodiments, the method includes moving the first and second switch halves from the second position to the third position when the first battery is fully charged, moving the first and second switch halves from the third position to the fourth position when the second battery is fully charged via the discharge from the first battery, moving the first and second switch halves back and forth between the third and fourth positions until both the first and second batteries have been cycled to satisfy a predetermined cycle criteria, and moving the first and second switch halves from the fourth position to the fifth position once the first battery is fully charged via the discharge of the second battery.

In another embodiment according to any of the previous embodiments, the method includes moving first and second switch halves from the fifth position once both the first and second batteries are fully charged to a sixth position where both the first and second batteries may be disconnected from the power supply.

In another embodiment according to any of the previous embodiments, the method includes using an electronic control unit to control switching operations between the plurality of operational positions.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 1 is a schematic diagram of a battery charger system.

DETAILED DESCRIPTION

FIG. 1 shows a battery charger system 28 that can be used, for example, in a space station environment 12 to power a life support system. It should be understood that while the battery charger system 28 is shown as being used with space station environment, it may also, for example, be beneficial in other spacecraft applications where there is limited cooling capacity for electronics.

As shown in FIG. 1, the battery charger system 28 includes a power supply 20 and a switch 22 connected to the power supply 20, wherein the switch 22 has a first switch half S1A and a second switch half S1B. A first battery B1 is selectively connected to the power supply 20 via the switch 22. A second battery B2 is also selectively connected to the power supply 20 via the switch 22. A control 24 moves the first and second switch halves S1A, S1B between a plurality of operational positions to fully charge the first battery B1, discharge the first battery B1 into the second battery B2, discharge the second battery B2 into the first battery B1, and fully charge the second battery B2.

The battery charger system 28 cycles (charges & discharges) a pair of batteries, e.g. the first and second batteries B1, B2, in sequence and provides two fully charged batteries when the process is completed. The plurality of operational positions for the first and second switch halves S1A, S1B includes at least a first position A where the first and second batteries B1, B2 are connected to a charger module 28 but not connected to the power supply 20, a second position B where both the first and second switch halves S1A, S1B are positioned to charge the first battery B1, a third position C where the first and second switch halves S1A, S1B are positioned to discharge the first battery B1 into the second battery B2, a fourth position D where the first and second switch halves S1A, S1B are positioned to discharge the second battery B2 into the first battery B1, and a fifth position E where the switch halves S1A, S1B are positioned to charge the second battery B2.

When the switch 22 is in position A, the first and second batteries B1 and B2 are connected to the auto-cycler/charger module 28. After the batteries B1 and B2 are connected, the switch 22 is moved to position B so that the first battery B1 is charged by the power supply 20. The system also includes a current regulator CR1 that is used to limit charging current into the first B1 and second B2 batteries and to limit discharging current out of the first B1 and second B1 batteries. The current regulator CR1 controls charge current to follow a prescribed optimal profile based on battery type, and/or controls discharge current to follow a prescribed optimal profile based on the battery type.

As discussed above, the current regulator CR1 regulates the current according to an optimal charge profile. After the first battery B1 is fully charged, the switch 22 is moved to the third position C. With the aid of power supply 20, the first battery B1 discharges into the second battery B2. The current regulator CR1 regulates the discharge profile of the first battery B and the charge profile of the second battery B2.

As shown in FIG. 1, the current regulator CR1 connects the second half S1B to the power supply 20. The current regulator CR1 is configured such that the batteries B1 and B2 do not charge or discharge too quickly, which could result in damaging the batteries or overheating the batteries and the surrounding environment.

After the second battery B2 is fully charged, the switch 22 is moved to the fourth position D. With the aid of power supply 20, the second battery B2 discharges into the first battery B1. The current regulator CR1 regulates the discharge profile of the second battery B2 and the charge profile of the first battery B1. The switch 22 can be cycled between positions C and D until both batteries B1, B2 have been adequately cycled (charged & discharged) to satisfy a predetermined cycle criteria.

In one example, the predetermined cycle criteria comprise a fixed number of times per use. For example, the switch 22 could be moved back and forth three times each time the batteries B1, B2 are connected to the charger module 28. In another example, capacity measuring equipment M could be utilized to determine how well each battery B1, B2 is holding charge. The batteries B1, B2 can then be cycled a number of times dependent upon the how well each battery is holding charge.

Finally, once the cycling process is complete, the switch 22 is moved to the fifth position E to apply a final charge to the second battery B2. Once the second battery B2 is fully charged, the charging operation can be stopped by moving the switch 22 to a sixth position F. At this point both batteries B1, B2 will have been cycled and fully charged. The batteries can then be disconnected from the charger module 28.

A control 30 comprising an electronic control unit ECU automatically controls switching operations between the plurality of operational positions. Any type of ECU can be used to control operation of the power supply 20, switch 22, switch control 24, etc. Further, it would be easily understood by one of ordinary skill in the art that the control 30 could be programmed to move the switch halves in the manner described above. The first switch half S1A is connected to the positive side (+) of the power supply 20 and the second switch half S1B is connected to the negative side (−) of the power supply 20. The control 30 is configured to move the first and second switch halves S1A, S1B simultaneously together between the various operational positions.

A method of recharging a battery system comprises the steps of connecting a switch 22 to a power supply 20, providing a first battery B1 that can be selectively connected to the power supply 20 via the switch 22 and a second battery B2 that can be selectively connected to the power supply 20 via the switch 22, and moving the first and second switch halves S1A, S1B between a plurality of operational positions to fully charge the first battery B1, discharge the first battery B1 into the second battery B2, discharge the second battery B2 into the first battery B1, and fully charge the second battery B2.

As discussed above, the method includes the steps of moving the first and second switch halves S1A, S1B from the second position B to the third position C when the first battery B1 is fully charged, moving the first and second switch halves S1A, S1B from the third position C to the fourth position D when the second battery B2 is fully charged via the discharge from the first battery B1, moving the first and second switch halves S1A, S1B back and forth between the third C and fourth D positions until both the first and second batteries B1, B2 have been cycled to satisfy a predetermined cycle criteria, and moving the first and second switch halves S1A, S1B from the fourth position D to the fifth position E once the first battery B1 is fully charged via the discharge of the second battery B2.

Additional steps include at least one of moving first and second switch halves S1A, S1B from the fifth position E to a sixth position F where both the first and second batteries B1, B2 are fully charged and are disconnected from the power supply 20, and using an electronic control unit 30 to control switching operations between the plurality of operational positions.

As such, rather than wasting energy by discharging through a resistive device as in the prior art, the subject invention discharges a battery to charge another battery. This both conserves energy and reduces the amount of waste heat that must be transferred to the environment. These benefits are important for applications where energy is costly or it is difficult or expensive to dissipate waste heat.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A battery charger system comprising:
   a power supply;
   a switch connected to the power supply, the switch having a first switch half and a second switch half;
   a first battery that may be selectively connected to the power supply via the switch;
   a second battery that may be selectively connected to the power supply via the switch;
   a control to move the first and second switch halves between a plurality of operational positions to fully charge the first battery, discharge the first battery into the second battery, discharge the second battery into the first battery, and fully charge the second battery;
   wherein the plurality of operational positions includes
   at least a first position where the first and second batteries are connected to a charger module but not connected to the power supply,
   a second position where both the first and second switch halves connect the first battery to the power supply to charge the first battery,
   a third position where the first and second switch halves are positioned to discharge the first battery into the second battery,
   a fourth position where the first and second switch halves are positioned to discharge the second battery into the first battery, and
   a fifth position where the switch halves are positioned to charge the second battery.

2. The battery charger system of claim 1, including a current regulator to limit charging current into the first and second batteries and to limit discharging current out of the first and second batteries, and wherein the current regulator controls charge current to follow a prescribed optimal profile based on battery type, and/or to control discharge current to follow a prescribed optimal profile based on the battery type.

3. The battery charger system of claim 1, wherein the first and second switch halves are moved from the second position once the first battery is fully charged to the third position to charge the second battery from the discharge of the first battery.

4. The battery charger system of claim 3, wherein the first and second switch halves are moved from the third position once the second battery is fully charged via the discharge from the first battery to the fourth position to charge the first battery from the discharge of the second battery.

5. The battery charger system of claim 4, wherein the first and second switch halves are moved back and forth between the third and fourth positions until both the first and second batteries have been cycled to satisfy a predetermined cycle criteria.

6. The battery charger system of claim 5, wherein the first and second switch halves are moved from the fourth position once the first battery is fully charged via the discharge of the second battery to the fifth position to perform a final charge of the second battery without discharging the first battery.

7. The battery charger system of claim 6, wherein the first and second switch halves are moved from the fifth position, once the first and second batteries are both fully charged, to a sixth position where both the first and second batteries may be disconnected from the power supply.

8. The battery charger system of claim 1, wherein the control is an electronic control unit that automatically controls switching operations between the plurality of operational positions.

9. The battery charger system of claim 1, wherein the first switch half is connected to a positive side of the power supply and the second switch half is connected to a negative side of the power supply.

10. The battery charger system of claim 9, wherein the first and second switch halves move simultaneously together between the plurality of operational positions.

11. The battery charger system of claim 1 wherein the control moves the first and second switch halves between the plurality of operational positions to fully charge the first battery, discharge the first battery into the second battery, discharge the second battery into the first battery, and fully charge the second battery with the aid of the power supply.

12. The battery charger system of claim 1 wherein charging and discharging of the first and second batteries occurs with the aid of the power supply.

13. A method of recharging a battery system comprising:
   connecting a switch to a power supply, the switch having a first switch half and a second switch half;
   providing a first battery that can be selectively connected to the power supply via the switch and a second battery that can be selectively connected to the power supply via the switch;
   moving the first and second switch halves between a plurality of operational positions to fully charge the first battery, discharge the first battery into the second battery, discharge the second battery into the first battery, and fully charge the second battery;
   wherein the plurality of operational positions includes at least a first position where the first and second batteries are connected to a charger module but not connected to the power supply, a second position where both the first and second switch halves connect the first battery to the power supply to charge the first battery, a third position where the first and second switch halves are positioned to discharge the first battery into the second battery, a fourth position where the first and second switch halves are positioned to discharge the second battery into the first battery, and a fifth position where the switch halves are positioned to charge the second battery, and including moving the first and second switch halves from the second position once the first battery is fully charged to the third position to charge the second battery from the discharge of the first battery, moving the first and second switch halves from the third position once the second battery if fully charged via the discharge from the first battery to the fourth position to charge the first battery from the discharge of the second battery, moving the first and second switch halves back and forth between the third and fourth positions until both the first and second batteries have been cycled to satisfy a predetermined cycle criteria, and moving the first and second switch halves from the fourth position once the first battery is fully charged via the discharge of the second battery to the fifth position to perform a final charge of the second battery without discharging the first battery.

14. The method of claim 13 including moving first and second switch halves from the fifth position, once both the first and second batteries are fully charged, to a sixth position where both the first and second batteries may be disconnected from the power supply.

15. The method of claim 14 including using an electronic control unit to control switching operations between the plurality of operational positions.

16. The method of claim 13, wherein charging and discharging of the first and second batteries occurs with the aid of the power supply.

\* \* \* \* \*